United States Patent
Knoll et al.

(10) Patent No.: US 6,436,333 B1
(45) Date of Patent: Aug. 20, 2002

(54) METHOD FOR MANUFACTURING MOLDED ARTICLES FROM A CERAMIC COMPOSITE STRUCTURE

(75) Inventors: Guenter Knoll, Stuttgart; Gert Lindemann, Lichtenstein; Friederike Lindner, Gerlingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/230,647
(22) PCT Filed: May 12, 1998
(86) PCT No.: PCT/DE98/01305
  § 371 (c)(1),
  (2), (4) Date: Sep. 30, 1999
(87) PCT Pub. No.: WO98/54110
  PCT Pub. Date: Dec. 3, 1998

(30) Foreign Application Priority Data

May 28, 1997 (DE) .......................................... 197 22 321

(51) Int. Cl.[7] ............................................. C04B 35/587
(52) U.S. Cl. ........................ 264/666; 264/614; 264/656; 264/676; 264/668
(58) Field of Search .......................... 252/518; 264/666, 264/614, 676, 656, 668

(56) References Cited

U.S. PATENT DOCUMENTS

| | | | | |
|---|---|---|---|---|
| 4,379,110 A | * | 4/1983 | Greskovich et al. | ........ 264/666 |
| 4,475,029 A | * | 10/1984 | Yoshida et al. | ............. 252/518 |
| 5,045,513 A | * | 9/1991 | Mizuno et al. | ............. 264/666 |
| 5,880,439 A | * | 3/1999 | Deevi et al. | ................ 219/535 |

* cited by examiner

Primary Examiner—James Derrington
(74) Attorney, Agent, or Firm—Kenyon & Kenyon

(57) ABSTRACT

A method for manufacturing molded articles from a ceramic composite structure, in particular from a combination of tri-silicon tetranitride and a metal silicide, in which gas pressures up to 100 bar are used and the sintering additive content can be reduced to under 10 mass percent. This inert gas sintering pressure method makes possible larger molding free spaces in complicated geometrical structures of the molded articles, in contrast to the known methods. In addition, the electrical properties of this composite structure can be regulated by adjusting a defined nitrogen partial pressure.

24 Claims, 1 Drawing Sheet

METHOD FOR MANUFACTURING MOLDED ARTICLES FROM A CERAMIC COMPOSITE STRUCTURE

FIELD OF THE INVENTION

The present invention relates to a method for manufacturing molded articles from a ceramic composite structure, in particular from a tri-silicon tetranitride metal silicide composite structure.

BACKGROUND INFORMATION

Ceramic materials in their potential with regard to higher operational temperatures are significantly superior to comparable materials, for example metal alloys. In this context, tri-silicon tetranitride materials are particularly suitable for various applications, in particular those involving high temperatures, these materials distinguishing themselves in their superior mechanical as well as electrical properties, when in corresponding composite structures in combination with electrically conductive compounds. Non-oxidic ceramic materials having a silicon base have a high resistance to thermomechanical stress, and also, in high temperature ranges up to, for example, 1300° C., are substantially resistant to oxidation and corrosion. Another further important aspect of non-oxidic ceramic materials lies in the controlled adjustment of their electrical properties, particularly in material combinations and composite structures.

German Patent No. 37 34 274 describes ceramic materials having a base of silicon nitride, aluminum nitride, and β-sialon in combination with secondary phases of various silicides, carbides, borides, and nitrides of transitional metal elements. In accordance with the secondary-phase content, these materials possess adjustable electrical properties. The adjustable specific values for the electrical resistance of these materials is between $1*10^{13}$ and $1*10^{-4}$ Ωcm at room temperature, and they demonstrate a positive dependence on temperature (PTC effect). The strength level of these composite materials, produced in this manner, is not below 200 Mpa. The method employed there for manufacturing composite materials that are resistant to great heat is designated as single-axis hot-pressing, which has particular disadvantages with regard to the molding of articles manufactured from these composite materials, can have anisotropic material properties due to the direction of pressing, and is applicable only as a charging method, i.e., not as a continuous method. In addition, this method requires high temperatures and pressures.

Furthermore, it is known to manufacture electrically insulating composite materials that are resistant to high temperatures having a base of tri-silicon tetranitride having metal silicides of the formula $MSi_2$ and $M_5Si_3$, M being a transitional metal or a main group metal, manufacturing taking place by gas pressure sintering at a pressure of 100 bar $N_2$ (See German Patent Application No. 195 00 832, and European Patent Application No. 0 721 925). As a result of the necessary high pressures of up to 400 Mpa, among other reasons, gas pressure sintering is expensive and cumbersome. Hot-pressing also requires axial pressures of up to 30 Mpa, it is expensive, and it is only applicable for simple components.

SUMMARY OF THE INVENTION

A method according to the present invention, in contrast to the conventional methods described above, has the advantage that greater free space for shaping is possible for molded articles that are thermomechanically highly stressed, in combination with the controlled variation of their electrical properties. In addition, complicated geometric structures can be realized by an essentially more favorable processing in the green state. This is achieved in that, first, in a multistep pressing process, the article to be molded is pressed in an isostatically cold state and then is rendered in the desired form. As a result, there is no need for a cumbersome hard-processing, for example after the hot-sintering, such as is required in a single-axis pressing process.

In another embodiment, after the cold isostatic molding press step, a first sintering at atmospheric pressure using an inert gas is carried out. Thus the shaping undertaken is further solidified (strengthened).

In an advantageous manner, the final sintering is carried out in a protective gas partial pressure, preferably nitrogen, from 2 to 10 bar. In this context, the sintering temperature of this sintering is between 17000° and 1900° C. From a phase diagram of the components employed, A and B, it can be inferred under these conditions that only the pure phases A and B are present, and possible mixed phases do not occur. Thus it is particularly avoided that, for example, non-conductive phases or phase transitions or poorly conductive phases lessen or decisively impair the desired electrical properties of the sintered final product.

In another embodiment of the present invention, the sintering takes place in a range of the protective gas partial pressure log $p(N_2)$, which is defined by an upper limit $Y_1$ and a lower limit $Y_2$. In this context, the nitrogen partial pressures $Y_1$ and $Y_2$ and the sintering temperature T have the following relation to each other:

$Y_1 = 7.1566 \cdot ln(T) - 52.719$ $Y_2 = 9.8279 \cdot ln(T) - 73.988$

As a result, it is assured that in the phase diagram of the system of the chosen materials, only the pure phases also occur in this area. As a result of the variable relation between temperature and pressure, an optimal range is thus defined which, by changing the temperature and pressure, permits maintaining the optimal method parameters in a further range, without, in this context, resulting, for example, in thermal decomposition, particularly of a thermally less stable component such as a nitride. In addition, as a result of this defined relation between pressure and temperature, mixed phases having undesirable profile characteristics are avoided in a simple way.

Preferably, in the ceramic composite structure, tri-silicon tetranitride is used as component A and a metal silicide as component B. As silicide, the most commonly used metal silicides, for example, $MoSi_2$, can be considered. Tri-silicon tetranitride, in contrast to its homologues of boron and nitrogen, has greater hardness and a better sintering capacity.

It is advantageous to use as protective gas either nitrogen or a mixture of nitrogen and an inert gas, for example argon, so that a potential decomposition reaction of the nitride employed, in particular, $Si_3N_4$, after a subsequent equilibrium reaction, is substantially suppressed:

$Si_3N_4 \rightleftharpoons 3Si + 2N_2$

The application of the Le Chatelier Principle, by increasing the concentration of one component of the equilibrium, thus makes it possible in a simple manner to increase the thermodynamic stability of $Si_3N_4$. Thus the sintering temperatures themselves lying above the decomposition point of $Si_3N_4$ are usable for the sintering process. In addition, it is thus possible to reduce the concentration of sintering additives in $Si_3N_4$, which are often disruptive of the electrical properties, for example, aluminum oxide or yttrium oxide, to a value of under 10% by weight. It is similarly advantageous that the total pressure can be controlled and adjusted in a simple manner by adding a second inert gas, e.g., argon. This has a particularly advantageous influence on the sintering product with regard to the achieved material thickness of the two sintering variants, without altering the electrical properties.

DETAILED DESCRIPTION

Figure 1:
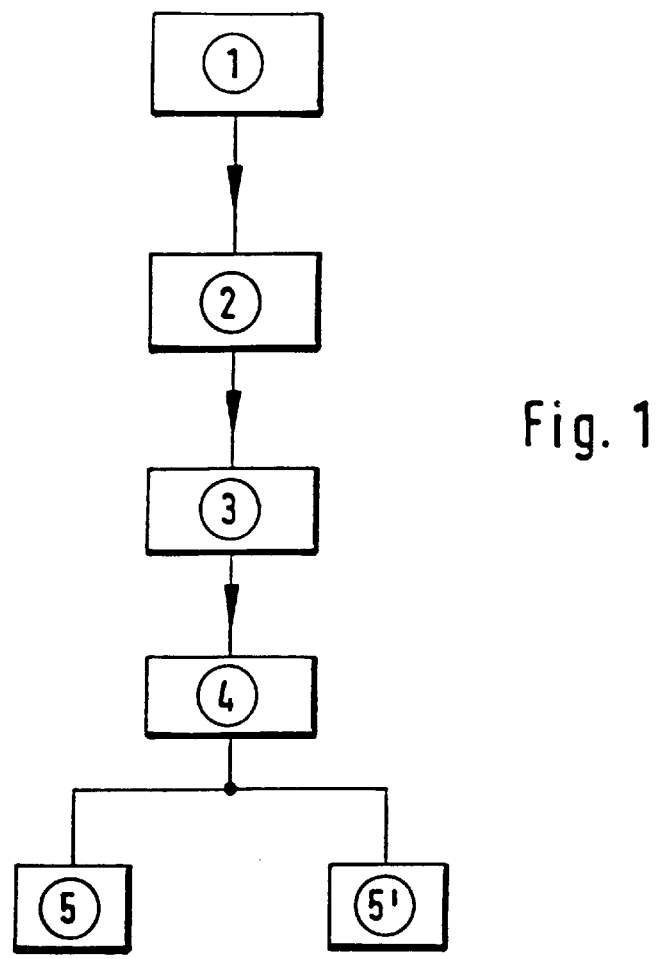
FIG. 1 shows exemplary steps of a method according to the present invention.

FIG. 1 shows exemplary steps of the method according to the present invention. In this context, in step 1, a powder mixture, composed, for example, of the raw materials $Si_3N_4$ and appropriate additives, e.g., $Al_2O_3$ and $Y_2O_3$ or other known sintering additives, and $MSi_2$, M standing, for example, for Mo, Nb, W, Ti, as well as, if appropriate, organic pressing- or binding agents, is prepared by mixing and grinding in an attrition mill along with an organic solvent. Step 2 includes drying the so-called attritted suspension in a rotation evaporator. Step 3 represents the cold-isostatic pressing of the dried powder into molded articles. Step 4 includes the pre-sintering and the removal of the binding agent under the influence of an inert gas atmosphere at a pressure of approximately 1 bar at a temperature of up to 900° C. Step 5 includes the so-called main sintering at a defined protective partial pressure, for example, of nitrogen, the $N_2$ partial pressure in the sintering gas not exceeding 10 bar, and at the same time the sintering temperature not exceeding 1900° C. In place of $N_2$, a nitrogen/inert gas mixture can be used. Step 5', which is an alternative to step 5, includes the main sintering at variable pressure and variable temperature. The $N_2$ partial pressure is varied with the temperature such that the partial pressure lies within a range that is limited by the following functions:

The upper limit follows the following equation:

$$Y_1 = \log p(N_2) = 7.1566 \cdot \ln(T) - 52.719,$$

and the lower limit follows the equation:

$$Y_2 = \log p(N_2) = 9.8279 \cdot \ln(T) - 73.988,$$

The value T is given in ° C. The value of p ($N_2$) is given in bar. The sintering temperature is not greater than 1900° C.

Figure 2:
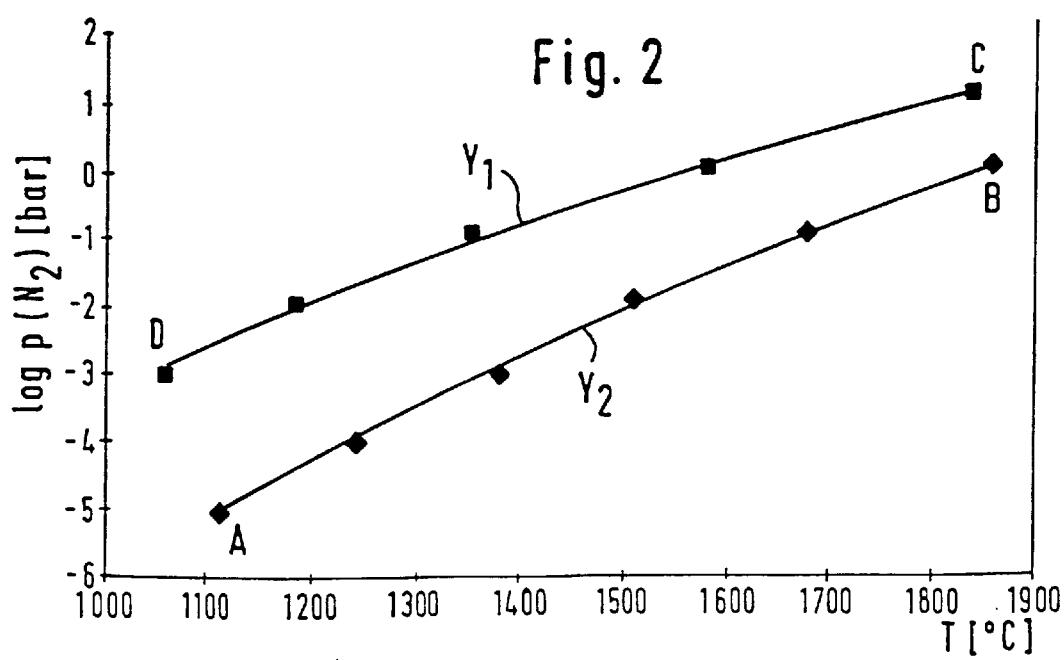
FIG. 2 shows an exemplary phase diagram for components A and B as a function of the temperature on the ordinate and the logarithm of the partial pressure of nitrogen on the abscissa.

FIG. 2 shows this range, which is limited by the two logarithmic functions in the context of a two-phase diagram. The curve between points D and C corresponds to the upper limit $Y_1$ and the curve between points A and B corresponds to $Y_2$. Below and above the two functions $Y_1$ and $Y_2$ are located mixing phases and decomposition phases, respectively, between the nitride and the silicide or protective gas used.

The expression "mass percent" will be designated below by the term MA%.

Below a first exemplary embodiment is described on the basis of process step 5:

A composite material, composed of 36 MA% $Si_3N_4$ and 60 MA% $MoSi_2$, as well as the sintering additives of 1.72 MA% $Al_2O_3$ and 2.28 MA% $Y_2O_3$, the average particle size of the $Si_3N_4$ used being 0.7 μm and that of the $MoSi_2$ being 1.8 μm, is compressed (compacted) in a cold-isostatic manner, to 200 Mpa. Then the presintering takes place in a nitrogen atmosphere at a pressure of 1 bar and at a temperature of 900° C. The subsequent main sintering, at a defined partial pressure of 10 bar and a sintering temperature of 1900° C. yields a material whose thickness is 97 % of the material thickness. The specific electrical resistance is $1*10^3$ Ωcm at 25° C.

A second exemplary embodiment is produced as follows on the basis of process step 5':

A composite material, composed of 63 MA% $Si_3N_4$ and 30 MA% $MoSi_2$, as well as the sintering additives of 3 MA% $Al_2O_3$ and 4 MA% $Y_2O_3$ the average particle size of the $Si_3N_4$ used being 0.7 μm and that of the $MoSi_2$ being 1.8 μm, is compressed, shown in a cold-isostatic manner, to 200 Mpa. After the presintering according to exemplary embodiment 1, the main sintering takes place within the phase range at variable pressure and temperature, the range being given by the points A, B, C, and D in FIG. 2. The thickness achieved of the material is 97% of the material thickness. The specific electrical resistance is 106 Ωcm at 25° C.

A third exemplary embodiment is manufactured analogously to the first, the main sintering, after preparation and presintering, taking place, however, at 1800° C. The nitrogen partial pressure is 5 bar, and the total sintering pressure is 20 bar. The sintering thickness achieved of the material is 98%. The specific resistance is $1*10^{-4}$ Ωcm.

What is claimed is:

1. A method for manufacturing a sintered molded article from a ceramic composite structure, the ceramic composite structure including at least two components which have different electrical conductivities from one another, the sintered molded article having an adjustable electrical conductivity, the method comprising the steps of:
   a) producing the molded article using a molding press procedure;
   b) after step (a), sintering the molded article at a first temperature in an inert gas; and
   c) after step (b), sintering the molded article at a second temperature in a nitrogen partial pressure of 2 bar to 10 bar, the first temperature being lower than the second temperature,
   wherein:
   the first temperature is at most 900° C;
   step (c) is performed at least one of at a variable temperature and in a variable nitrogen partial pressure so that, in a phase diagram, the ceramic composite structure includes pure phases of a first component and a second component of the at least two components; and
   the ceramic composite structure includes a tri-silicon tetranitride as the first component and a metal silicide as the second component.

2. The method according to claim 1, wherein step (a) is performed at an atmospheric pressure.

3. The method according to claim 1, wherein step (c) includes a substep of mixing argon with nitrogen.

4. The method according to claim 1, wherein the second temperature is between 1700° C. and 1900° C.

5. The method according to claim 1,
   wherein step (c) is performed in a range of the nitrogen partial pressure which has an upper limit ($Y_1$) and a lower limit ($Y_2$), and wherein the upper limit ($Y_1$) and the lower limit ($Y_2$) are determined according to the following:

$$Y_1 = 7.1566 \ln(T) - 52.719$$

and $$Y_2 = 9.8279 \ln(T) - 73.988$$

where T is the second temperature which is at most 1900° C.

6. A method for manufacturing a sintered molded article from a ceramic composite structure, the ceramic composite structure including at least two components which have different electrical conductivities from one another, the sintered molded article having an adjustable electrical conductivity, the method comprising the steps of:

a) producing the molded article using a molding press procedure;

b) after step (a), sintering the molded article at a first temperature in an inert gas; and c) after step (b), sintering the molded article at a second temperature in a nitrogen partial pressure of 2 bar to 10 bar, the first temperature being lower than the second temperature;

wherein step (c) is performed at least one of at a variable temperature and in a variable nitrogen partial pressure so that, in a phase diagram, the ceramic composite structure includes pure phases of a first component and a second component of the at least two components; and wherein the ceramic composite structure includes tri-silicon tetranitride as the first component and metal silicide as the second component.

7. A method for manufacturing a sintered molded article from a ceramic composite structure, the ceramic composite structure including at least two components which have different electrical conductivities from one another, the sintered molded article having an adjustable electrical conductivity, the method comprising the steps of:

a) producing the molded article using a molding press procedure;

b) after step (a), sintering the molded article at a first temperature in an inert gas; and c) after step (b), sintering the molded article at a second temperature in a nitrogen partial pressure of 2 bar to 10 bar, the first temperature being lower than the second temperature;

wherein step (c) is performed at least one of at a variable temperature and in a variable nitrogen partial pressure so that, in a phase diagram, the ceramic composite structure includes pure phases of a first component and a second component of the at least two components; and wherein the ceramic composite structure includes 30 mass percent to 70 mass percent of tri-silicon tetranitride, 25 mass percent to 65 mass percent of $MoSi_2$, 1.5 mass percent to 8 mass percent of $Al_2O_3$, and 2 mass percent to 2.5 mass percent of $Y_2O_3$.

8. The method according to claim 6, wherein the ceramic composite structure includes at least one of the following: 30 mass percent to 70 mass percent of tri-silicon tetranitride; 25 mass percent to 65 mass percent of $MoSi_2$; 1.5 mass percent to 8 mass percent of $Al_2O_3$; and 2 mass percent to 2.5 mass percent of $Y_2O_3$.

9. The method according to claim 8, wherein the ceramic composite structure includes 25 mass percent to 65 mass percent of $MoSi_2$.

10. The method according to claim 9, wherein the ceramic composite structure includes 2 mass percent to 2.5 mass percent of $Y_2O_3$.

11. The method according to claim 8, wherein the ceramic composite structure includes 1.5 mass percent to 8 mass percent of $Al_2O_3$.

12. The method according to claim 11, wherein the ceramic composite structure includes 2 mass percent to 2.5 mass percent of $Y_2O_3$.

13. The method according to claim 8, wherein the ceramic composite structure includes 2 mass percent to 2.5 mass percent of $Y_2O_3$.

14. The method according to claim 8, wherein the ceramic composite structure includes 30 mass percent to 70 mass percent of tri-silicon tetranitride.

15. The method according to claim 14, wherein the ceramic composite structure includes 25 mass percent to 65 mass percent of $MoSi_2$.

16. The method according to claim 15, wherein the ceramic composite structure includes 1.5 mass percent to 8, mass percent of $Al_2O_3$.

17. The method according to claim 15, wherein the ceramic composite structure includes 2 mass percent to 2.5 mass percent of $Y_2O_3$.

18. The method according to claim 14, wherein the ceramic composite structure includes 1.5 mass percent to 8 mass percent of $Al_2O_3$.

19. The method according to claim 18, wherein the ceramic composite structure includes 2 mass percent to 2.5 mass percent of $Y_2O_3$.

20. The method according to claim 14, wherein the ceramic composite structure includes 2 mass percent to 2.5 mass percent of $Y_2O_3$.

21. The method according to claim 1, wherein:

step (a) is performed at an atmospheric pressure;

step (c) includes a substep of mixing argon with nitrogen; and the second temperature is between 1700° C. and 1900° C.

22. The method according to claim 6, wherein: step (c) is performed in a range of the nitrogen partial pressure which has an upper limit ($Y_1$) and a lower limit ($Y_2$), the upper limit ($Y_1$) being proportional to a first function of $\ln(T)$ and the lower limit (Y2) being proportional to a second function of $\ln(T)$, where T is the second temperature which is at most about 1900° C.

23. The method according to claim 22, wherein $Y_1$ is proportional to $7.1566 \ln(T)$ and $Y_2$ is proportional to $9.8279 \ln(T)$.

24. The method according to claim 22, wherein $Y_1 = 7.1566 \ln(T) - 52.719$ and $Y_2 = 9.8279 \ln(T) - 73.988$.

* * * * *